(12) United States Patent
Koning

(10) Patent No.: US 6,735,666 B1
(45) Date of Patent: May 11, 2004

(54) METHOD OF PROVIDING DIRECT USER TASK ACCESS TO OPERATING SYSTEM DATA STRUCTURES

(75) Inventor: Maarten Koning, Bloomfield (CA)

(73) Assignee: Wind River Systems, Inc., Alameda, CA (US)

( * ) Notice: Subject to any disclaimer, the term of this patent is extended or adjusted under 35 U.S.C. 154(b) by 0 days.

(21) Appl. No.: 09/510,107

(22) Filed: Feb. 22, 2000

(51) Int. Cl.$^7$ .......................... G06F 12/00; G06F 12/14

(52) U.S. Cl. ..................... 711/102; 711/103; 711/152; 707/9; 707/205; 709/104; 713/2

(58) Field of Search ............................. 707/1, 9, 100, 707/200, 205; 709/100, 104; 710/40, 200, 244, 260; 711/1, 6, 102, 103, 170, 173, 152, 151, 163, 202; 713/2, 151

(56) References Cited

U.S. PATENT DOCUMENTS

| | | | | |
|---|---|---|---|---|
| 5,032,981 A | * | 7/1991 | Bril et al. ..................... | 711/220 |
| 5,381,549 A | * | 1/1995 | Tamura ........................... | 713/1 |
| 5,557,771 A | * | 9/1996 | Kawaguchi et al. ........ | 711/163 |
| 5,745,418 A | * | 4/1998 | Ma et al. ................ | 365/185.33 |
| 5,893,166 A | * | 4/1999 | Frank et al. ................ | 711/163 |

FOREIGN PATENT DOCUMENTS

| | | | |
|---|---|---|---|
| EP | 0327707 | | 8/1989 |
| EP | 0415515 A2 | | 3/1991 |
| FR | 2740235 | | 4/1997 |
| JP | 09016499 A | * | 1/1997 |
| JP | 10232786 A | * | 1/1998 |
| WO | WO 97/36236 | | 10/1997 |
| WO | WO 01/22209 A1 | * | 3/2001 |

OTHER PUBLICATIONS

Hennessy, et al. Computer Organization and Design. p. 597. Morgan Kaufmann Publishers, Inc., 1997.*

White, Ron. How Computers Work. ZD Press, 1997. pp. 10–13 and 84–85.*

"Use of Process–Scoped Address Translation for Access Control," *IBM Technical Disclosure Bulletin*, vol. 37, No. 2A, Feb. 1994.

van Wezenbeek et al., "A Survey of Memory Management," *Microprocessing and Microprogramming* 36 (1993), pp. 141–162.

Jeff Bonwick, The Slab Allocator: An Object–Caching Kernel Memory Allocator, 1994, 12 pages, Sun Microsystems.

Draves et al., The Rialto Virtual Memory System, Feb. 15, 1997, 14 pages, Microsoft Research.

Jones et al., An Overview of the Rialto Real–Time Architecture, Jul. 1996, 9 pages, Microsoft Research.

Mitchell et al., An Overview of the Spring System, 1994, 10 pages, Sun Microsystems Inc.

Khalidi et al., The Spring Virtual Memory System, Feb. 1993, 25 pages, Sun Microsystems Laboratories, Inc.

Hamilton et al., Subcontract: A Flexible Base for Distributed Programming, 1993, 11 pages, Sun Microsystems Laboratories, Inc.

(List continued on next page.)

*Primary Examiner*—B. James Peikari
(74) *Attorney, Agent, or Firm*—Kenyon & Kenyon (57) ABSTRACT

A system page is implemented to provide direct access to operating system data structures by user tasks. Frequently accessed data structures are located in the system page, and may be linked against during linking. The system page memory locations are mapped into user tasks as read-only memory locations, allowing read-only memory accesses during run-time. The system page reduces execution overhead without sacrificing system security.

11 Claims, 8 Drawing Sheets

Radia et al., Persistence in the Spring System, Dec. 1993, 12 pages, Sun Microsystems, Inc.

Radia et al., The Spring Name Service, Nov. 1993, 27 pages, Sun Microsystems Laboratories, Inc.

Radia et al., Naming Policies in the Spring System, 11 pages, Sun Microsystems Laboratories, Inc.

Hamilton et al., The Spring Nucleus A MicroKernel for Objects, Jul. 1993, 14 pages, Sun Microsystems Laboratories, Inc.

Nelson et al., High Performance Dynamic Linking Through Caching, 1993, 14 pages, Sun Microsystems Laboratories, Inc.

Reed et al., Nemesis The Kernel, Overview, May 20, 1997, 56 pages.

Steven Hand, ESPRIT LTR 21917 (Pegasus II), Deliverable 2.3.1: Virtual Address Management: Deliverable 2.3.2: Virtual Memory Management, Jul. 1997, 16 pages, University of Cambridge.

Timothy Roscoe, Linkage in the Nemesis Single Address Space Operating System, May 1994, 8 pages, Computer Laboratory, University of Cambridge.

Richard Black, ESPRIT LTR 21917 (Pegasus II), Deliverable 2.1.4., ARM Port Report, Jun. 1997, 13 pages, University of Cambridge, University of Glasgow.

Kempf et al., Cross–address Space Dynamic Linking, Sep. 1992, 12 pages, Sun Microsystems Laboratories, Inc.

Heiser et al., Implementation and Performance of the Mungi Single–Address–Space Operating System, Jun. 1997, 23 pages, IBM T. J. Watson, Research Center.

Vochteloo et al., Protection Domain Extensions in Mungi, Oct. 1996, 5 pages, School of Computer Science and Engineering, The University of New South Wales.

Heiser et al., Resource Management in the Mungi Single–Address–Space Operating Systems, Aug. 1997, 15 pages, School of Computer Science and Engineering.

VxWorks® Programmer's Guide 5.3.1, Edition 1, Mar. 4, 1997 Wind River Systems, Inc., 648 pp.

"The Design and Implementation of the Clouds Distributed Operating System", Dasgupta (Gerogia Tech), Computing Systems, Winter 1990.

"A Micro Kernal Architecture for Next Generation Processors," Okamoto (Toshiba Corp.), USENIX, 1992.

"Sharing and Protection in a Single Address Space Operating System (Opal)," Chase (University of Washington), 1995.

* cited by examiner

METHOD OF PROVIDING DIRECT USER TASK ACCESS TO OPERATING SYSTEM DATA STRUCTURES

BACKGROUND INFORMATION

Traditional multitasking operating systems (e.g., UNIX, Windows) have been implemented in computing environments to provide a way to allocate the resources of the computing environment (e.g., CPU, memory, Input/Output (I/O) devices) among various user programs that may be running simultaneously in the computing environment. The operating system itself comprises a number of functions (executable code) and data structures that may be used to implement the resource allocation services of the operating system.

Operating systems have also been implemented in a so-called "object oriented" manner. That is, when a particular function and/or data structure (defined by a "class" definition) is requested, the operating system creates ("instantiates") an "object" that uses executable code and/or data structure definitions specified in the class definition. Such objects thus may contain executable code, data structures, or both. Objects that perform actions are typically referred to as "tasks" (also known as "threads"), and a collection of tasks may be referred to as a "process." Upon loading and execution of the operating system into the computing environment, system tasks and data structures will be created in order to support the resource allocation needs of the system. User applications likewise upon execution may cause the creation of tasks ("user tasks"), processes ("user processes"), and other objects in order to perform the actions desired from the application.

In order to protect the operating system and each task running in the computing environment from interference from other tasks also running in the computing environment, typical operating systems apportion the computing environment's execution "space" (e.g., its memory) into a "system" space and a "user" space. The system space generally contains the operating system tasks and data structures, while the user space contains the code and data structures for user tasks. Typically, operating systems are designed so that user tasks cannot directly access the memory apportioned to system tasks. The operating system itself, however, can typically access all portions of memory.

Figure 1:
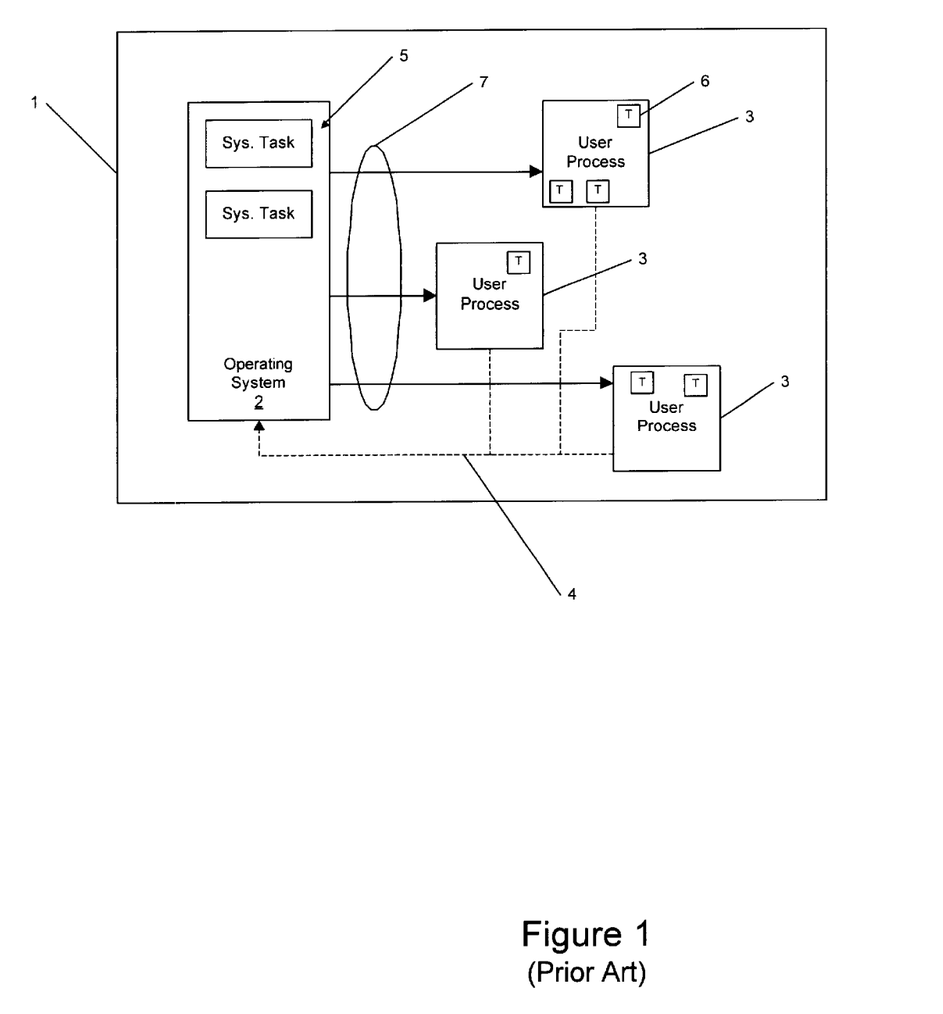
FIG. 1 shows a block diagram of a prior art protection model.

Conceptually, this "protection model" is illustrated by FIG. 1. In a computer system 1 controlled by an operating system 2, there may be any number of user processes 3 and system tasks 5 executing at one time. User processes 3 each include a number of user tasks 6. Because each user process 3 is only allocated a portion of the system memory, the operating system 2 may restrict access by any user task 6 affiliated with a particular user process 3 to the memory allocated to another user process or the operating system. Typically, however, system tasks 5 have unrestricted access to memory allocated to the operating system 2 and each user process 3 (indicated by direct connections 7).

There may be instances, however, when a user task desires access to resources controlled by the operating system. For example, a user task may want access to a network I/O connection, the control of which is delegated to a system task. Alternatively, a user task often may want to read information from a data structure maintained and used by the operating system (e.g., an error status report, or the time remaining until some preplanned system event occurs). Using known operating systems, in order to make such access, the user task is required to request execution of the system functions that perform the desired actions or control access to the desired data structures via a "system call". A system call is typically implemented via a special instruction used to cause the processor executing the code to "trap" to a trap routine (implemented in the system software) that makes a function call to the desired facilities of the operating system. Thus, the user task executing the system call cannot directly access the instructions and data structures in the system space it wishes to access, but rather must employ a special access procedure (represented in FIG. 1 as connections 4). Furthermore, since the user task is not permitted access to system resources or data structures, another task must be created by the operating system in the system space in order to perform the requested action. While this procedure protects the operating system from potential interference caused by user tasks, it increases system-processing overhead and thus increases execution time.

Certain operating systems, called "real-time operating systems," have been developed to provide a more controlled environment for the execution of application programs. Real-time operating systems are designed to be "deterministic" in their behavior, i.e., responses to an event can be expected to occur within a known time of the occurrence of the event. Determinism is particularly necessary in "mission-critical" applications, although it is generally desirable for all operating systems, as it increases the reliability of the system. Real-time operating systems are therefore implemented to execute as efficiently as possible with a minimum of overhead.

Particularly in real-time systems, it is common and desirable for user tasks to obtain information about the overall state of the operating system, or information about particular aspects of the operating systems operations. This information allows tasks to operate more efficiently and reliably. For example, in a real time application, where a user task must return an answer by a deadline, a user process may choose a different method of computing a result depending on how much CPU time the user process expects to receive. A faster less, accurate method of computing might be used when the system is busy and less computation time is available, while a more accurate, but resource-intensive method might be used when more system resources are available. Similarly, a user process might decide to operate in a "safe" mode when errors have occurred. Thus, it would be beneficial to implement a system and method whereby user tasks are able to access operating system information without incurring operation overhead (such as created using the system trap) or compromising system security.

SUMMARY OF THE INVENTION

According to the present invention, an exemplary computer system is described, comprising a memory space having a number of memory locations, an operating system, a software module located, a plurality of operating system data structures, a system page including a subset of the plurality of operating system data structures, and a function located within the software module.

A first method is also described as part of the exemplary embodiment according the present invention. The method includes the steps of creating a task assigned to execute at least one function, assigning a memory access map to the task, including in the memory access map indications of read-only access to memory locations of a system page including operating system data structures, and allowing a read memory access by the task to the system page.

A second method is also described as part of the exemplary embodiment according to the present invention. The second method includes the steps of retrieving a software module having a symbol reference used by an instruction, resolving the symbol reference to obtain a symbol value for the symbol, and inserting a symbol value in the into the instruction.

DETAILED DESCRIPTION

According to the exemplary embodiment of the present invention, an operating system is provided that includes a "system page." In the exemplary embodiment, the system page is part of the memory space allocated to the operating system. The system page contains a subset of operating system data structures ("variables") that may be used by the operating system to store state information. These variables can be both read and written by operating system tasks. In addition, according to the present invention, user tasks are allowed direct, read-only access to system page variables, without the need to access these system page variables through a system call. User tasks may therefore obtain system information stored in system page variables without incurring the execution overhead produced by using a system trap (thus increasing execution speed) and without allowing alteration of these variables (thus maintaining system security).

Figure 2:
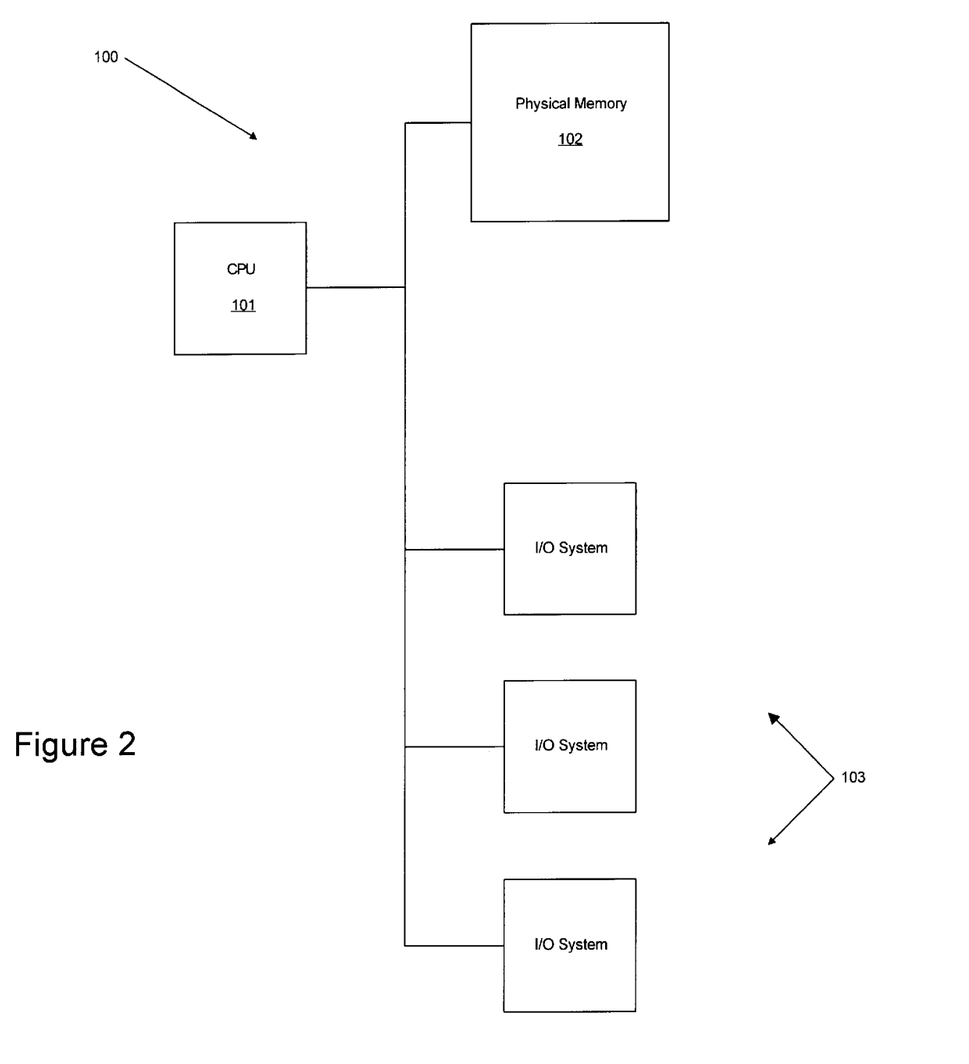
FIG. 2 shows a block diagram of an exemplary computer system according to the present invention.

An exemplary embodiment of a computing environment including an operating system having a system page according to the present invention is illustrated by FIGS. 2–8. FIG. 2 is a block diagram of the exemplary computing environment 100. Computing environment 100 includes a CPU 101, which is coupled to a physical memory system 102 and a number of I/O systems 103. Connection of the CPU 101 to the physical memory system 102 and the number of I/O systems 103 may be according to any of the well known system architectures (e.g., PCI bus) and may include additional systems in order to achieve connectivity. I/O systems 103 may comprise any of the well-known input or output systems used in electronic devices (e.g., serial port, modem, network connection, mouse, display). Physical memory system 102 may include RAM or other memory storage systems for operational memory, and read only memory and/or other non-volatile storage systems for storage of software (an operating system, other applications) to be executed in computing environment 100. Alternately, software may be stored externally of computing environment 100 and accessed from one of the I/O systems 103 (e.g., via a network connection). CPU 101 may also include a memory management unit (MMU, not shown) for implementing virtual memory mapping, caching, privilege checking and other memory management functions, as is well known. In systems without virtual memory, a simpler form of memory management unit, sometimes called a guarded memory unit, may be used for implementing privilege checking.

Figure 3:
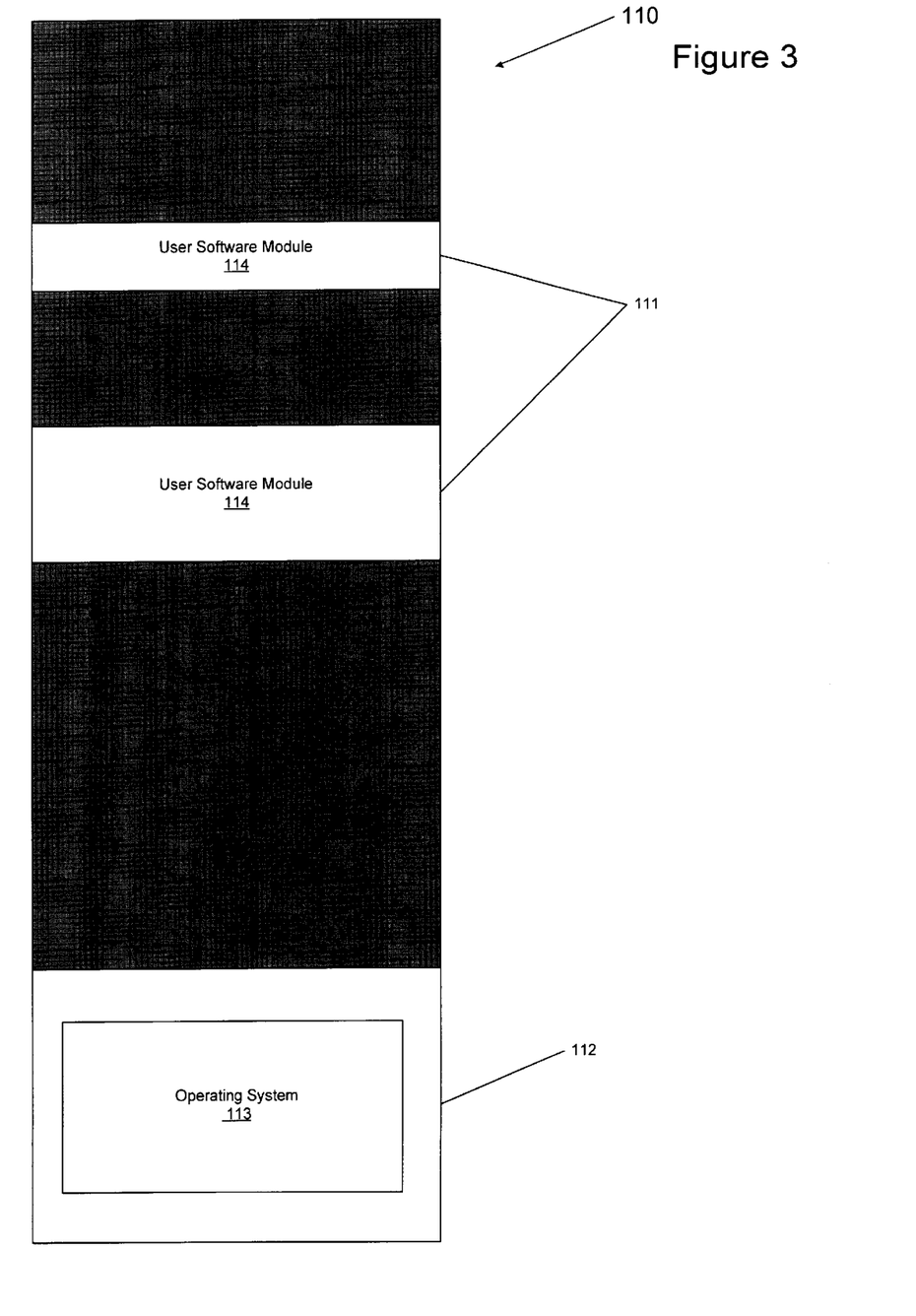
FIG. 3 shows an exemplary memory space of the exemplary computer system of FIG. 2, according to the present invention.

FIG. 3 illustrates an exemplary memory space 110 of exemplary computing environment 100. Memory space 110 is, for example, an addressable virtual memory available in the computer system 100 (which may be equal to or greater than the amount of physical memory provided in computing environment 100, depending on system memory management implementations). Memory space 110 may also include memory locations assigned as "memory mapped I/O" locations, allowing I/O operations through the memory space 110.

Memory space 110 includes a system space 112 and a user space 111. The system space 112 is used by an operating system 113 that controls access to all system resources (such as physical memory system 102 and I/O systems 103). The operating system 113 includes functions (executable code) and data structures, as well as a number executing system tasks and system objects that perform system control functions (e.g., context switching between tasks). As shown in FIG. 3, user space 111 may include a number of user software modules 114 that have been loaded into the memory space 110 after the operating system 113 has begun executing in system space 112. The size of the system space 112 and user space 111 may be dynamically altered by the operating system 113 according to, for example, the number of software modules present in the system (and the amount of executable code/data structures within the software modules).

Figure 4:
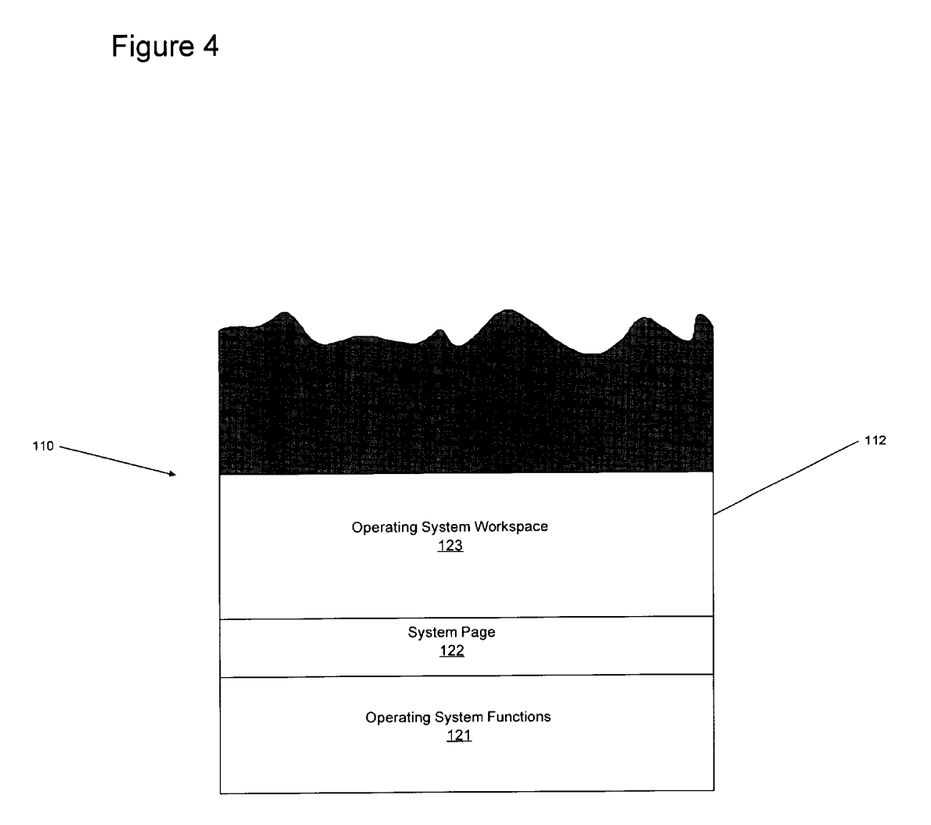
FIG. 4 shows an exemplary system space in the exemplary computer system of FIG. 2, according to the present invention.

FIG. 4 shows a more detailed view of the system space 112 and operating system 113. The system space 112 includes operating system functions 121 which are, for example, executable code used by system tasks. The system space 112 also includes an operating system workspace 123, which contains various data structures used by system tasks in performing operating system functions—stacks, heaps, linked lists, pointers and other data structures. System tasks are permitted complete access to data structures and other system objects in system space 112.

Exemplary system space 112 also includes a "system page" 122. System page 122 includes a subset of the overall collection of data structures (variables) used by the operating system 113 to store system state information, and, in this exemplary embodiment, includes operating system data structures that may be frequently accessed by user tasks executing in the computing environment 100.

Figure 5:
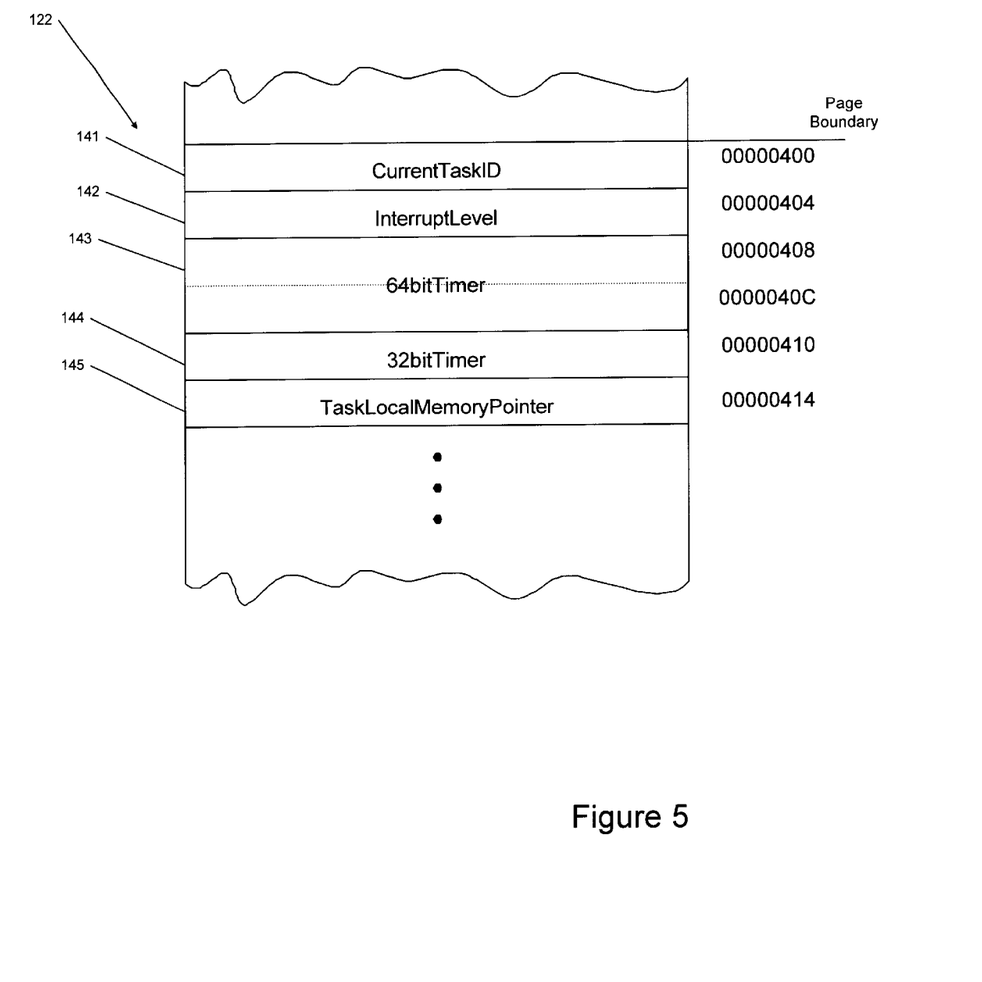
FIG. 5 shows a diagram of a system page in the exemplary computer system of FIG. 2, according to the present invention.

FIG. 5 shows a more detailed view of the exemplary system page 122. As mentioned above, the system page 122 is used to store system information that may be requested by user tasks. In the exemplary embodiment, the system page 122 includes the following values: a currently executing task identifier 141, an interrupt counter 142 indicating the current nesting level of interrupts (i.e., how many interrupts deep is the current process on the interrupt stack), a 64-bit absolute time counter 143 and a 32-bit absolute time counter 144, which indicate the time since the system was turned on, and a pointer 145 to a per-thread storage area that a currently executing task can read and write. Other system data structures might advantageously be included in the system page 122, depending on the specific design of the operating system or the nature of the application. Although these variables are shown as a table in this exemplary embodiment as simple 4-byte and 8-byte data structures, the system page could be implemented with more complex data structures, as may be desired for particular system implementations.

Figure 6:
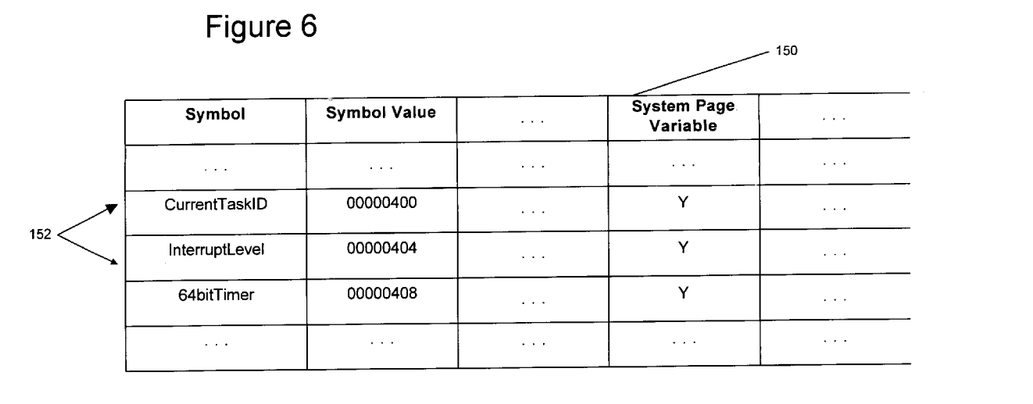
FIG. 6 shows an exemplary symbol table for the exemplary system page, according to the present invention.

System page 122 may be created, for example, during loading of operating system 113 into memory space 110. As part of the loading process, an operating system symbol table may be created to allow linking to operating system data structures and functions. Symbols for system page variables will be included in the operating system symbol table to allow linking by user functions (described below). An exemplary operating system symbol table 150 is shown in FIG. 6. Symbols for system page data structures have entries 152 that include a field indicating that the symbol is a system page variable. As discussed below, a linker can examine this field to determine if user functions can link to the operating system symbol.

In a system with virtual memory, it is also advantageous to implement the exemplary system page 122 so that the system page is "page aligned," i.e., so that the system page data structures start at the beginning of a virtual memory page (as shown in FIG. 5). Such alignment may allow the MMU of the computing environment 100 to be used to enforce access protection rules for the system page 122 at run time, as will be described below. Page alignment may be accomplished by many known methods, depending on the method used to implement virtual memory in the computer system that includes the system page. For example, if the C or C++ language is used, page alignment can be accomplished by defining the system page variables in a separate file that is simply located at the beginning of the data section and modifying the linker to force the data section to be page aligned. For performance reasons, it may also be advantageous to insure that the system page fits within a single virtual memory page (typically four kilobytes).

In the exemplary embodiment according to the present invention, user tasks executing in computing environment 100 may only access functions and data structures in system space 112 through the use of a "protected" access (such as a system trap). However, as part of this exemplary embodiment, user tasks are allowed read-only access to the memory locations associated with the system page 122. Specifically, functions in user software modules 114 may link to memory locations associated with the system page 122 at link time, and user tasks executing the functions of software modules 114 may be allowed to perform memory reads to memory locations associated with the system page 122 during execution. Since user tasks are permitted to directly access the variables of the system page 122, no protected accesses are needed that could increase execution overhead. Furthermore, since user tasks are not permitted to perform memory writes to system page memory locations, system security is maintained.

Figure 7:
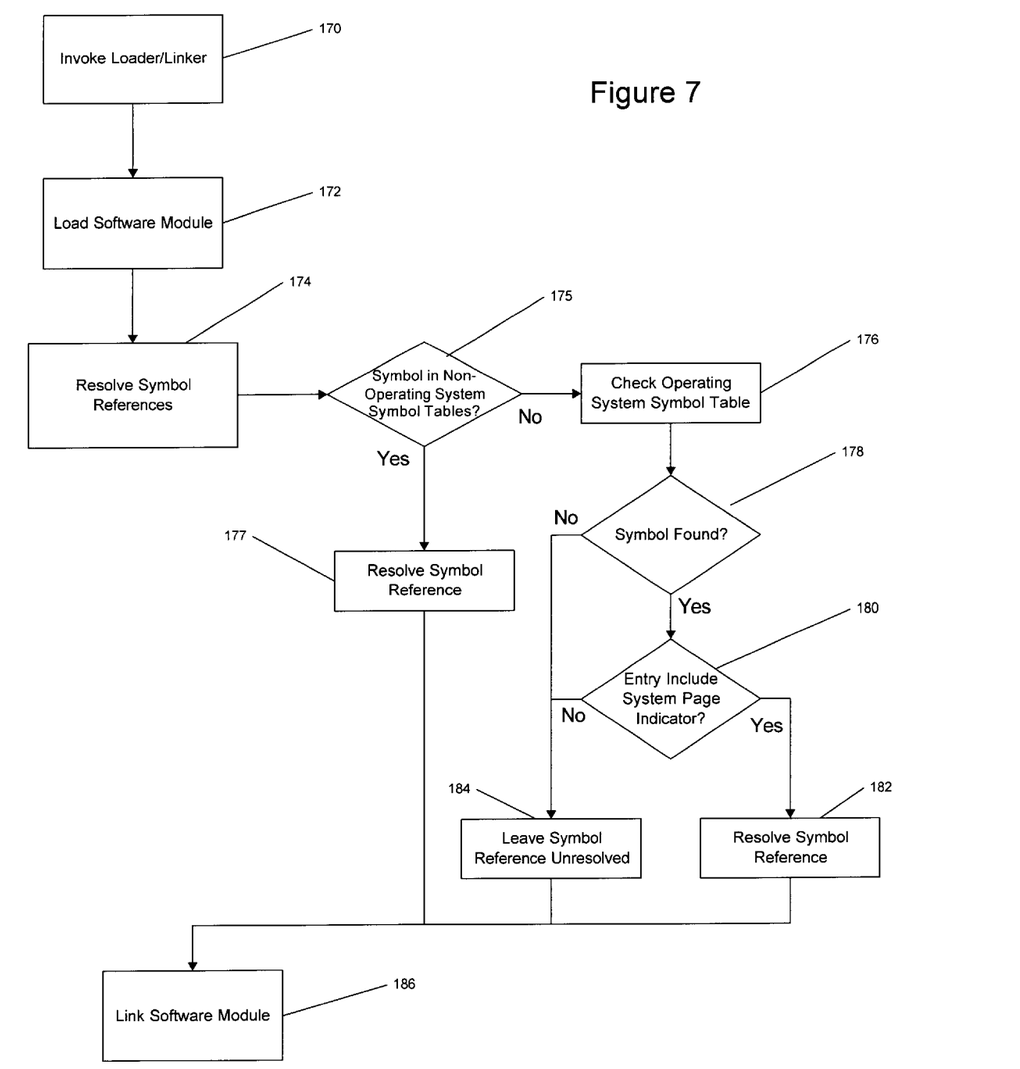
FIG. 7 shows a flowchart of an exemplary linking process according to the present invention.

FIG. 7 illustrates a flow chart of an exemplary loading and linking process for a software module 114 of a user application in conjunction with the exemplary system page according to the present invention. This linking process may be performed by a linker/loader application, for example, provided with the operating system 113. In step 170, the linker/loader is invoked to load the software module into computing environment 100 and link the software module 114 to other software modules 114 already loaded into computing environment 100 and/or with the operating system 113.

The software module may initially be stored within the physical memory system 102 of the computing environment 100 or outside the computing environment 100 (accessed through the I/O systems 103).

In step 172, the software module 114 is loaded into user space 111. Operating system 113 allocates a portion of the memory space 110 to the software module 114, and the instructions and data structures of the software module 114 are loaded into memory locations corresponding to the portion of memory space 110 allocated to the software module 114. Memory references in the software module 114 may be relocated based on the location of the software module 114 in the memory space 110, as is well known. In step 174, symbol references in the software module 114 are resolved by searching any symbol tables in the computing environment 100 for symbol definitions corresponding to the symbol reference. Symbol definitions found in symbol tables other than the operating system symbol table (step 175) are resolved (step 177). If these other symbol tables in the computing environment 100 do not include an entry for the symbol referenced, the operating system symbol table will be searched (step 176). If the symbol reference matches a symbol in the operating system symbol table (step 178), the symbol entry will be checked to see if an indication is present that the symbol is associated with a system page variable (step 180). If so, the linker will resolve the symbol reference using the symbol value for the symbol (step 182). If not, the linker will not resolve the symbol reference (step 184), and may also indicate that a link could not be established (for example, by aborting the linking process or providing a message to the user). If the symbol reference is not found in the operating system symbol table, the linker will not resolve the symbol reference (step 184), and also may indicate that the link could not be established. In step 186, the software module is linked, for example, by inserting the symbol values into the appropriate instructions in the loaded software module.

Figure 8:
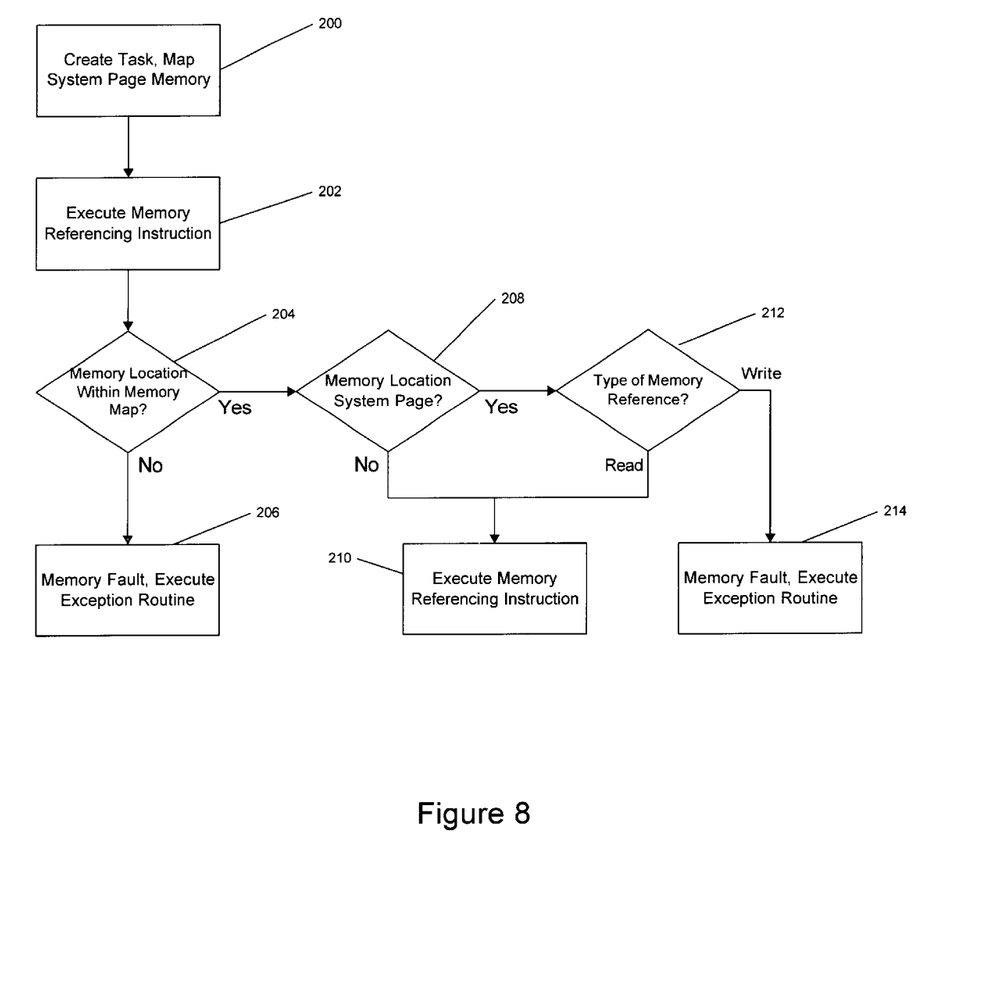
FIG. 8 shows a flowchart of an exemplary memory reference process, according to the present invention.

The method of controlling memory referencing in the exemplary embodiment during task execution is illustrated in FIG. 8. Initially, a user task is created (instantiated) by the operating system 113, for example, by request from a user to execute the software modules 114 loaded into the memory space 110 (step 200). The user task includes task control information, which may include a memory allocation map indicating the portion of the memory space 110 that may be accessed by the user task. One example of such a memory map is a bit map corresponding to each virtual page in the memory space 110, such that virtual pages accessible to the user task are indicated in the memory map as set bits. Another example is a set of memory addresses or ranges of memory addresses for the portion of the memory space 110 accessible by the user task. Alternately, the task control information for each task may not include a memory map, but each virtual page in memory space 110 may include indicators for user task accessibility. According to the exemplary embodiment, the memory map of user task includes those memory locations in the portion of the memory space 110 that have been allocated to the software modules 114 to be executed by the user task.

The operating system 113 also inserts into the task memory map the system page memory locations, thus allowing the task to directly access the system page memory locations (i.e., without the need for a system call). However, the operating system sets indicators that only permit the task to obtain read-only access to the system page memory locations. In the current example, access indicators (e.g., flag bits) are associated with the system page memory locations indicating whether user tasks are permitted read-only access.

These indicators may be set prior to task creation (e.g., during memory allocation for the system page). Access indicators may also be included in the memory map of the task control block (allowing task-specific access to the system page), in which case these indicators may be set after task creation and inserted into the memory map.

In step 202, user task executes an instruction in a software module 114 that attempts to reference a memory location. This memory reference may be through the use of a direct reference to the memory location desired, by de-referencing a pointer, or other well-known software construct. In step 204, the memory reference is checked to see if the referenced memory location is in the portion of the memory space 110 accessible to the user task (as reflected by the memory map for the user task in this example). This memory checking may be accomplished, for example, using the facilities of the MMU of computing environment 100, such as a standard translation look-aside buffer and memory page-mapping system. If the memory location is not within the portion of memory space accessible to the user task 114, a memory fault occurs (step 206), which may be handled by an exception handling routine within the operating system 113 (which, for example, may result in the termination of the task).

If the memory location is within the portion of the memory space 110 mapped to the user task, an additional check is made to determine if the memory access is to the system page 122 (step 208), for example, by checking the access indicators to determine if the memory location is marked as read-only for the task. If the memory access is not to the system page 122, the memory access is executed (step 210). If the memory access is to the system page 122, a further check is made to determine if the memory access by the user task is a read access or a write access (step 212). If the user task is attempting to read from the system page 122, such access is permitted and the memory access is executed (step 210). If the user task is attempting to write to the system page, a memory fault occurs (step 214) causing the execution of the appropriate exception handling routine by the operating system 113.

As can be seen from the description above, enforcement of system page protection may be performed using a minimum of overhead (particularly where an MMU is available in the computing environment) and regardless of the method in which the system page is referenced (direct, de-referenced pointer, register pointer, etc.). Thus the system page according to the present invention allows quick access by user tasks to selected operating system variables without compromising system security and without the need for protected accesses or additional tasks.

In the preceding specification, the invention has been described with reference to specific exemplary embodiments thereof. It will, however, be evident that various modifications and changes may be made thereunto without departing from the broader spirit and scope of the invention as set forth in the claims that follow. The specification and drawings are accordingly to be regarded in an illustrative rather than restrictive sense.

What is claimed is:

1. A method, comprising the steps of:

creating a task, the task assigned to execute at least one function;

assigning a memory access map to the task including indications of access to a portion of a user memory space allocated to the at least one function;

setting access indicators of direct read-only access by the task for memory locations of a system page including operating system data structures, the system page located within a system memory space separate from the user memory space;

including in the memory access map indications of access to the memory locations of the system page; and allowing a direct read memory access by the task to the operating system data structures.

2. The method of claim 1, further comprising:

executing an exception handling routine when the task attempts a write memory access to the operating system data structures.

3. The method of claim 2, further comprising:

signaling an error condition indicating that the write memory access was attempted.

4. The method of claim 1, wherein the operating system data structures include an identifier of a currently executing task.

5. The method of claim 1, wherein the operating system data structures include a timer.

6. The method of claim 1, wherein the operating system data structures include a counter indicating a current level of interrupt nesting.

7. The method of claim 1, wherein the allowing of the read memory access by the task to the operating system data structures is performed by a memory management unit.

8. The method of claim 1, wherein the setting of access indicators of read-only access for memory locations of the system page occurs prior to the creation of the task.

9. The method of claim 8, wherein the access indicators are associated with the memory locations of the system page.

10. The method of claim 1, wherein the memory access map includes a range of memory addresses.

11. The method of claim 1, wherein the memory access map includes a bit map of memory pages.

* * * * *